United States Patent
Bisset et al.

(10) Patent No.: US 6,671,592 B1
(45) Date of Patent: Dec. 30, 2003

(54) AUTONOMOUS VEHICULAR APPLIANCE, ESPECIALLY VACUUM CLEANER

(75) Inventors: David Lindsey Bisset, Wiltshire (GB); Alan Gerard Clark, Wiltshire (GB)

(73) Assignee: Dyson Limited, Wiltshire (GB)

( * ) Notice: Subject to any disclaimer, the term of this patent is extended or adjusted under 35 U.S.C. 154(b) by 0 days.

(21) Appl. No.: 09/868,486

(22) PCT Filed: Dec. 16, 1999

(86) PCT No.: PCT/GB99/04259

§ 371 (c)(1), (2), (4) Date: Jun. 18, 2001

(87) PCT Pub. No.: WO00/38029

PCT Pub. Date: Jun. 29, 2000

(30) Foreign Application Priority Data

Dec. 18, 1998 (GB) ................................ 9827779

(51) Int. Cl.[7] .............................. G06G 7/78; G06G 7/02
(52) U.S. Cl. ........................ 701/23; 701/301; 340/301; 340/435; 180/167; 56/10.2 R; 56/10.2 F; 56/328 R
(58) Field of Search .............................. 701/23, 26, 24, 701/301; 340/435, 301; 342/132; 180/167, 169, 168; 56/10.2 A, 10.2 R, 10.2 F, 10.2 K, 10.2 J, 328 R, 327 R (56) References Cited

U.S. PATENT DOCUMENTS

| | | | | |
|---|---|---|---|---|
| 5,001,635 A | * | 3/1991 | Yasutomi et al. | ........... 364/449 |
| 5,321,614 A | * | 6/1994 | Ashworth | ................... 318/587 |
| 5,867,800 A | * | 2/1999 | Leif | ............................ 701/23 |
| 6,076,226 A | * | 6/2000 | Reed | ............................ 15/319 |
| 6,255,793 B1 | * | 7/2001 | Peless et al. | ................ 318/580 |
| 6,417,641 B2 | * | 7/2002 | Peless et al. | ................ 318/580 |

OTHER PUBLICATIONS

Francis McSwiggan, To Design and Build a Portable, Miniaturised, Multichannel FM Transmitter, Apr. 24, 1998, Sections 2.4, 2.4.1, 2.4.2.*

* cited by examiner

Primary Examiner—Thomas G. Black
Assistant Examiner—Tuan C To
(74) Attorney, Agent, or Firm—Morrison & Foerster LLP (57) ABSTRACT

Portable threshold locators (32B, 32C, 32D) are placed in a room (120) at locations to define at least part of a boundary within which an autonomous vehicular appliance is to be confined. Typically, the threshold locator is placed in a doorway (32B) or at the top of a staircase (32D). The vehicle has a detection system which allows the autonomous vehicular appliance to detect the presence of the portable threshold locator. The detection system receives a signal from the threshold locator and the autonomous vehicular appliance uses the received signal to avoid the threshold marked by the locator (32B, 32C, 32D). The autonomous vehicular appliance is preferably a robotic floor cleaning appliance, such as a robotic vacuum cleaner.

26 Claims, 7 Drawing Sheets

AUTONOMOUS VEHICULAR APPLIANCE, ESPECIALLY VACUUM CLEANER

This application claims priority to International Application No. PCT/GB99/04259 which was published on Jun. 29, 2000.

FIELD OF THE INVENTION

This invention relates to an autonomous aplliance, and more particularly to a robotic floor cleaning device, typically a robotic vacuum cleaner.

BACKGROUND OF THE INVENTION

There has long been a desire for a vacuum cleaner which is capable of cleaning a room without the need for a human user to push or drag the cleaner around the room. A number of robotic or autonomous vacuum cleaners have been proposed. The control mechanism for these cleaners includes sensors for detecting obstacles and walls so that the vacuum cleaner is capable of guiding itself around a room so as to clean the carpet or other floor covering without human intervention. While autonomous cleaners are generally capable of dealing with most rooms, there are certain limits on what such cleaners are capable of and autonomous cleaners have been known to struggle in avoiding certain types of obstacle in a room. One particularly problematic type of obstacle is the threshold to a descending stairway. Some autonomous cleaners have been sold with instructions not to use them in rooms having certain types of feature. Clearly, this limits the usefulness of an autonomous cleaner.

Some known autonomous floor cleaning devices use navigation beacons or transponders placed around a room. Signals received at the cleaning device from the beacons help the cleaning device determine its position in the room Typically, the cleaning device determines its position within the room by a triangulation method which uses a signal received from each of the beacons, The location of the beacons in the room may be known by the cleaning device in advance or the cleaning device may establish their location during a trip around the perimeter of the room. Such beacons are of a high enough power to allow a cleaning device to receive a signal from each of the beacons, wherever it may be positioned In the room, A cleaner of this is shown in U.S. Pat. No. 5,682,313 (Edlund el al.). The cleaner firstly performs a wall tracking routine using its ultrasonic sensors and registers the position of the transponders around the room during this routine. The cleaner is subsequently able to determine its position within the room by using a signal received from each of the transponders and the knowledge of the location of the transponders within the room that it has gained during the wall tracking routine. The use of an infrared beacon as a navigational aid is shown in U.S. Pat. No. 5,165,064.

EP 0 774 702 describes a boundary detection system for an automated robot in which the inner and outer boundaries of a working area are defined by magnetic markers.

SUMMARY OF THE INVENTION

The present invention seeks to allow an autonomous vehicular appliance to be used in a wider range of environments.

A first aspect of the present invention provides an autonomous vehicular appliance in combination with at least two threshold locators which can be placed, in use, at locations to define at least part of a boundary of an area within which the autonomous vehicular appliance is to be confined at least temporarily, the threshold locators differing in the signal that they transmit, the appliance being provided with a navigation system for navigating the appliance around the area and a detection system to allow the appliance to detect the presence of the threshold locators, the detection system comprising means for receiving a signal from a threshold locator and wherein the appliance is arranged to use the received signal to detect the part of the boundary defined by the threshold locator and, upon detecting the first threshold locator, to prevent itself from crossing the part of the boundary marked by the threshold locator and, upon detecting the second threshold locator, to prevent itself from crossing the part of the boundary marked by the threshold locator until a certain condition has been met.

Other aspects of the present invention provide an autonomous vehicular appliance and a method of cleaning an area using an autonomous vehicular appliance.

The vehicle's own navigation system comprises sensors that allow the vehicle to find features of the room, such as walls and obstacles, and to navigate around the room with respect to these. However, the vehicle may have difficulty in detecting certain features of the room and in recognising that these features form part of the boundary of the room within which the vehicle should remain. The threshold locators serve to define a boundary at these places and allow the vehicle to recognise that these places should form part of the boundary. This arrangement is particularly advantageous when the appliance is a robotic floor cleaning device and the threshold locators are used to define part of a boundary of a room which the floor cleaning device should not cross. The portable threshold locator is typically placed in doorways to confine the cleaning device to a room or at the top of a staircase to prevent the cleaning device falling down the stairs. Without the threshold locator, a doorway will usually be regarded by the cleaning device as an open space into which it can move. As well as use in defining the perimeter of the room, it can also be used to mark a boundary around obstacles within the room which the appliance may otherwise have difficulty in detecting, such as a plant with trailing leaves.

The threshold between areas (rooms) can be marked by using the threshold locator which transmits a different signal to the other threshold locators. The appliance treats the threshold between areas as one that should not be crossed until a certain condition is met. This condition can be when the appliance has completely traversed the area.

Use of the threshold locator allows the appliance to be used in rooms having a much wider range of features or obstacles. Thus, the appliance can be used in more rooms of a user's home and requires less human supervision.

BRIEF DESCRIPTION OF THE DRAWINGS

The threshold locators may be permanently installed in a user's home at the required positions, or they may be used only for the time that the cleaning device is in operation, It is preferable that the locator is as compact as possible and more preferably takes the form of a strip that can be laid as required or conveniently installed beneath a carpet at the threshold.

The invention will now be more particularly describes, by way of example only, with reference to the accompanying drawings, in which.

DETAILED DESCRIPTION OF THE INVENTION

Figure 1:
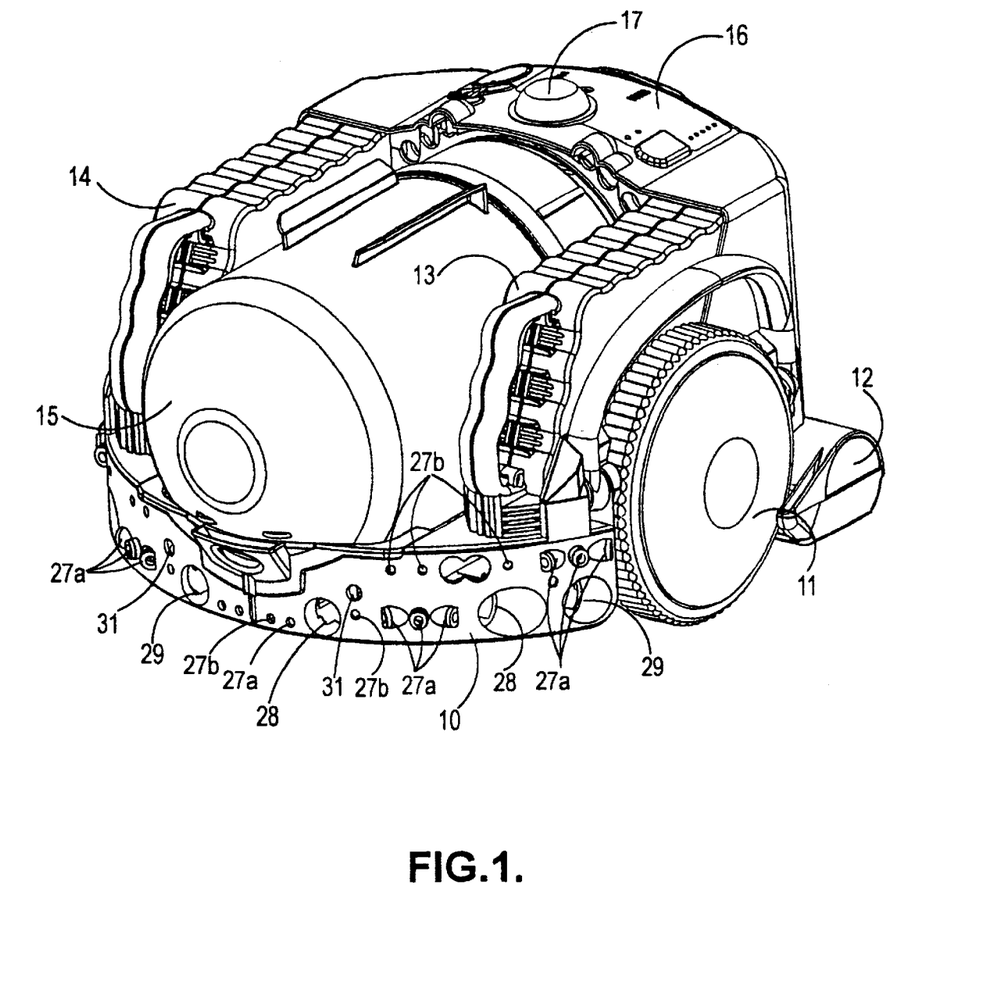
FIG. 1 is a perspective view of a robotic floor cleaning device.

Referring firstly to FIG. 1 of the drawings, there is shown therein a robotic floor cleaning device in the form of a robotic vacuum cleaner comprising a main body 10, two drive wheels 11 (only one of which is visible), a brush bar housing 12, two rechargeable batteries 13 and 14, a dual cyclone 15 of the type more fully described in EP-A-0042723, a user interface 16, a light detector 17 and various sensors 27 to 31 which will be more particularly described hereinafter. The light detector 17 detects light received from a plurality of compass points around the vacuum cleaner and is more fully described in our co-pending International Patent Application No. [our reference GBP0099].

Figure 2:
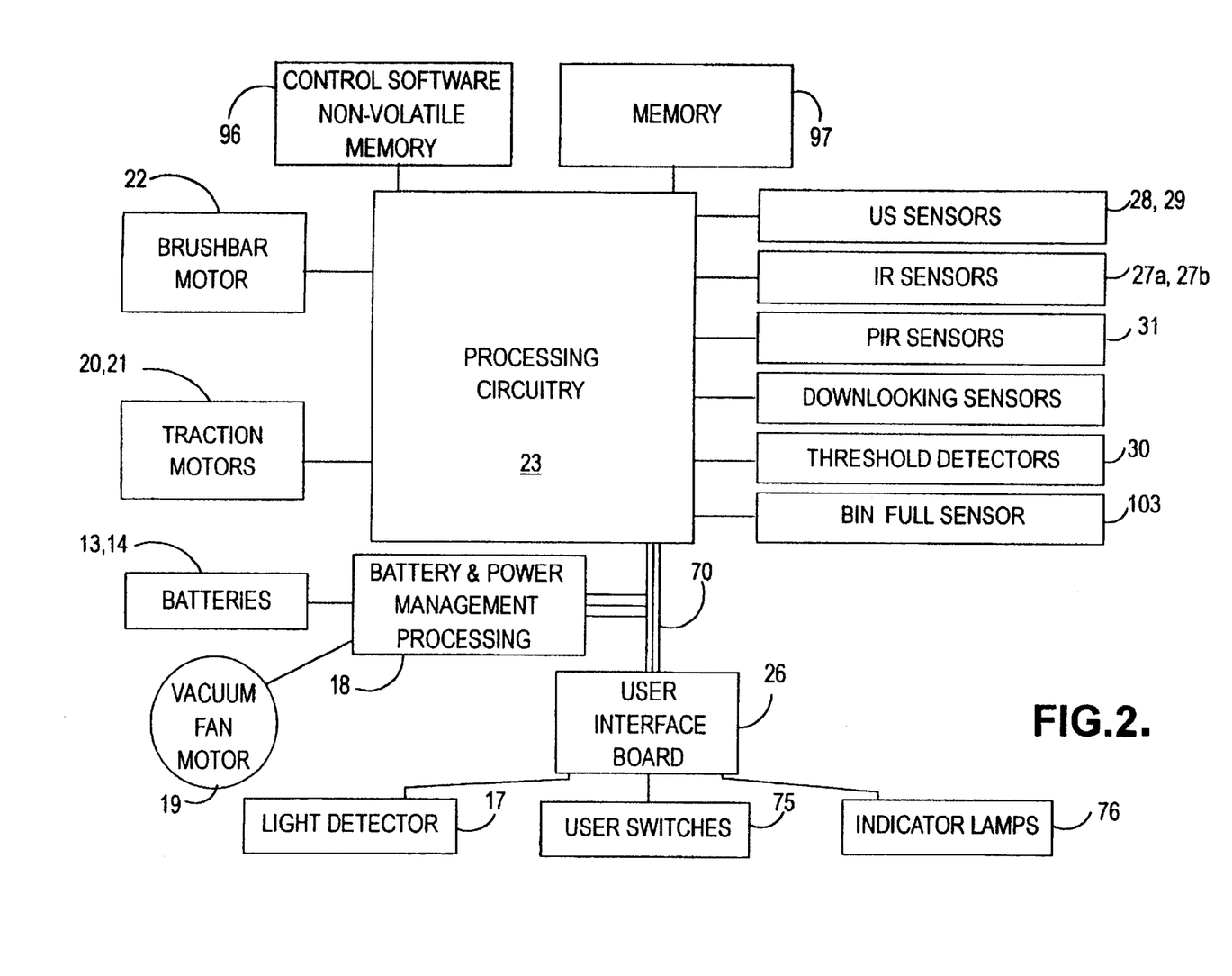
FIG. 2 is a circuit diagram of a power management system and a navigation on system for the robotic floor cleaning device shown in FIG. 1.

A control system for the cleaner is shown in FIG. 2. The circuit comprises two rechargeable batteries 13 and 14, a battery and motor management system 18, a motor 19 for driving a suction fan, motors 20 and 21 for driving the left and right hand wheels 11 of the vacuum cleaner, a motor 22 for driving a brush bar of the vacuum cleaner, processing circuitry 23 and a user interface board 26 with the light detector 17, user switches 75 and indicator lamps 76. Preferably the processing circuitry includes a microprocessor under the control of software stored on non-volatile memory 96 and a memory 97 for storing measurements from the sensors. A communication bus 70 conveys measurement information from the light detector 17 to the processing circuitry 23.

The robotic vacuum cleaner is equipped with a plurality of infra-red transmitters 27a and infra-red receivers 27b, a plurality of ultrasonic transmitters 28 and ultrasonic receivers 29, one or more threshold detectors 30 for detecting the presence of a portable threshold locator 32 placed, for example, at the entrance to a room or at the top of a staircase and one or more passive infrared (PIR) or pyroelectric detectors 31 for detecting animals and fires. There are four main ultrasonic receivers 29 which face forwards, rearwards and to opposite sides of the robotic vacuum cleaner. The signals received by these receivers not only provide information representative of distance from a feature of the room or from an object in the room but the amplitude and width of the received signals vary according to the sensed size, shape and type of material of the object.

Figure 3:
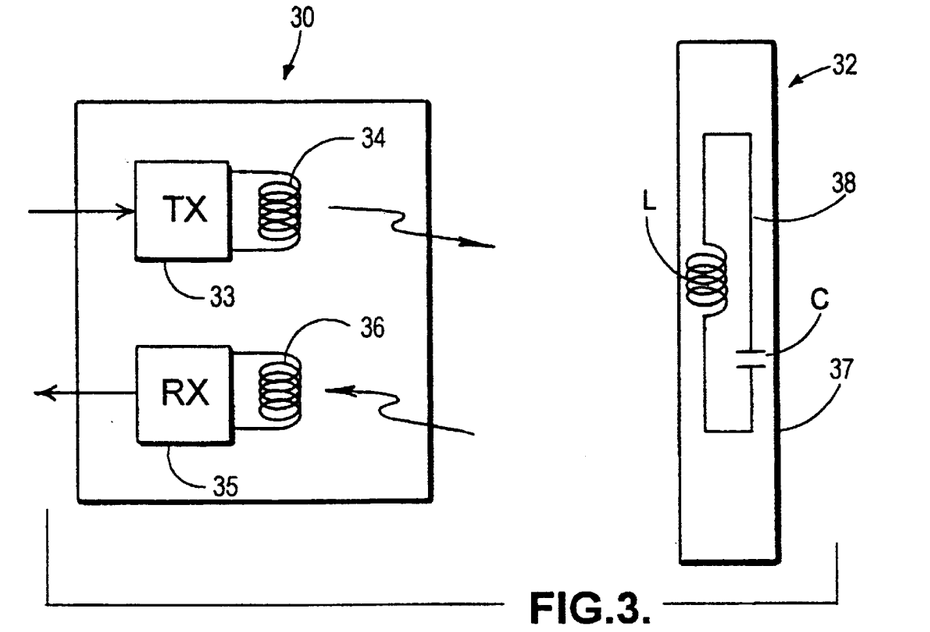
FIG. 3 is a schematic view of one embodiment of a threshold detector and a detection system.

As shown in FIG. 3, the threshold detector 30 comprises a radio frequency generator 33 connected to a transmitting coil 34 and a receiver 35 connected to a receiving coil 36.

The portable threshold locator 32 comprises an elongate strip 37 of plastics material, typically having a length approximately equal to the width of a doorway, and a passive circuit 38 for modifying a signal received from the threshold detector 30 on the cleaner and for transmitting the modified signal to the receiving coil 36 on the cleaner when the threshold detector 30 is in close proximity to the threshold locator 32. As shown, the modifying circuit 38 is in the form of a loop resonator circuit (having a capacitor C and an inductor L connected in a loop) embedded in the strip 37 of plastics material. It is preferable for the resonance to be distributed along the length of the strip 37 so that the threshold detector 30 on the cleaner can detect the presence of the threshold locator 32 wherever the cleaner may be along the length of the strip.

The radio frequency generator 33 periodically produces a radio frequency signal having a frequency which is the same or substantially the same as the resonant frequency of the loop resonator circuit 38. This radio frequency signal may also sweep to either side of the frequency of the resonant circuit 38. When one of the threshold detectors 30 is close to a threshold locator 32, the receiver 35 will receive a weak signal which is longer than the transmitted signal and this will enable the microprocessor 23 to identify the presence of the threshold locator 32. Preferably, the transmitter 39 has an antenna gain profile which is relatively even across the length of the threshold that the threshold locator 32 is serving to mark. Similarly to the distributed resonance of the passive circuit embodiment, this allows the threshold detector 30 on the cleaner to detect the presence of the threshold locator 32 wherever the cleaner may be along the length of the strip, and the more even the gain profile, the more evenly the cleaner will be able to follow the boundary.

Figure 4:
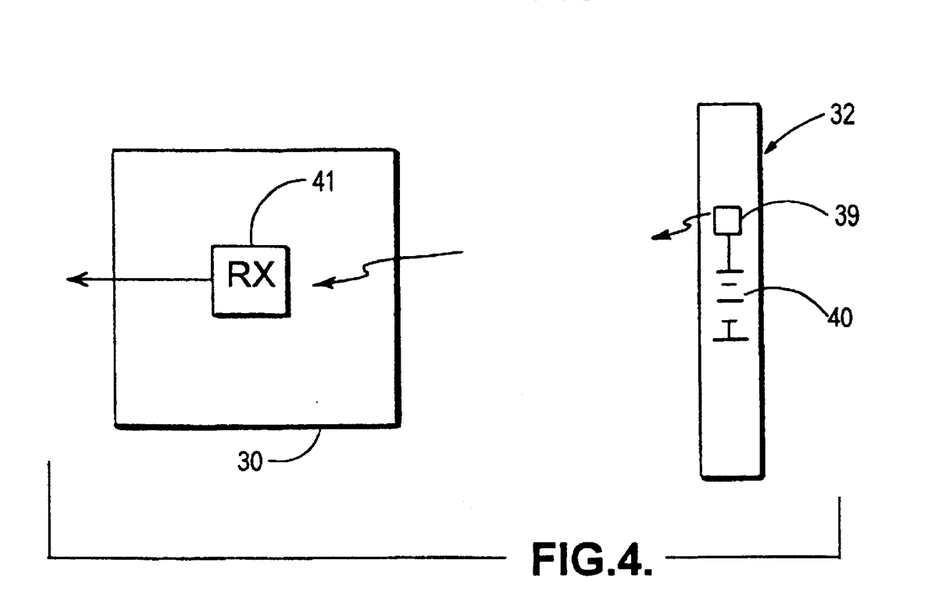
FIG. 4 is a schematic view of another embodiment of a threshold detector and a detection system.

In an alternative arrangement, shown in FIG. 4, the portable threshold locator 32 could include a signal transmitter 39 powered by a rechargeable battery, typically a lithium ion battery 40. In this case, each of the threshold detectors 30 would simply comprise a receiver 41 for receiving a signal from the transmitter 39 of the threshold locator 32.

In yet a further alternative arrangement, the threshold detector 30 could comprise a transmitting coil for generating a magnetic, electrical or electromagnetic field and a receiving coil which will normally pick up the fundamental frequency of the transmitted signal. In this case, the portable threshold locator 32 includes a small piece of metal alloy, or other suitable material, which becomes saturated by the field generated by the detector 30 when the robotic vacuum cleaner is in close proximity to the threshold locator 32 and generates an array of harmonics which are picked up by the receiving coil. The fundamental frequency is filtered out leaving low level harmonics which are particular to the target alloy used. The threshold locator could, in this case, be in the form of a length of tape.

In each of the embodiments, the cleaner receives a signal from the threshold locator when the threshold detector of the cleaner is close to the threshold locator 32. A signal received at the threshold detector is supplied to processing circuitry 23. Various techniques can be used to determine when the cleaner is close to the threshold locator. A preferred method monitors a quantity of the received signal and decides when the monitored quantity meets a predetermined limit. When the monitored quantity meets this limit, the threshold locator is deemed to be close enough and the cleaner navigates in a direction to follow a path which maintains the monitored quantity at this limit. The monitored quantity can be field strength of the received signal and the when the monitored field strength exceeds a predetermined limit, the cleaner navigates in a direction to follow a path of substantially equal field strength.

Figure 5A:
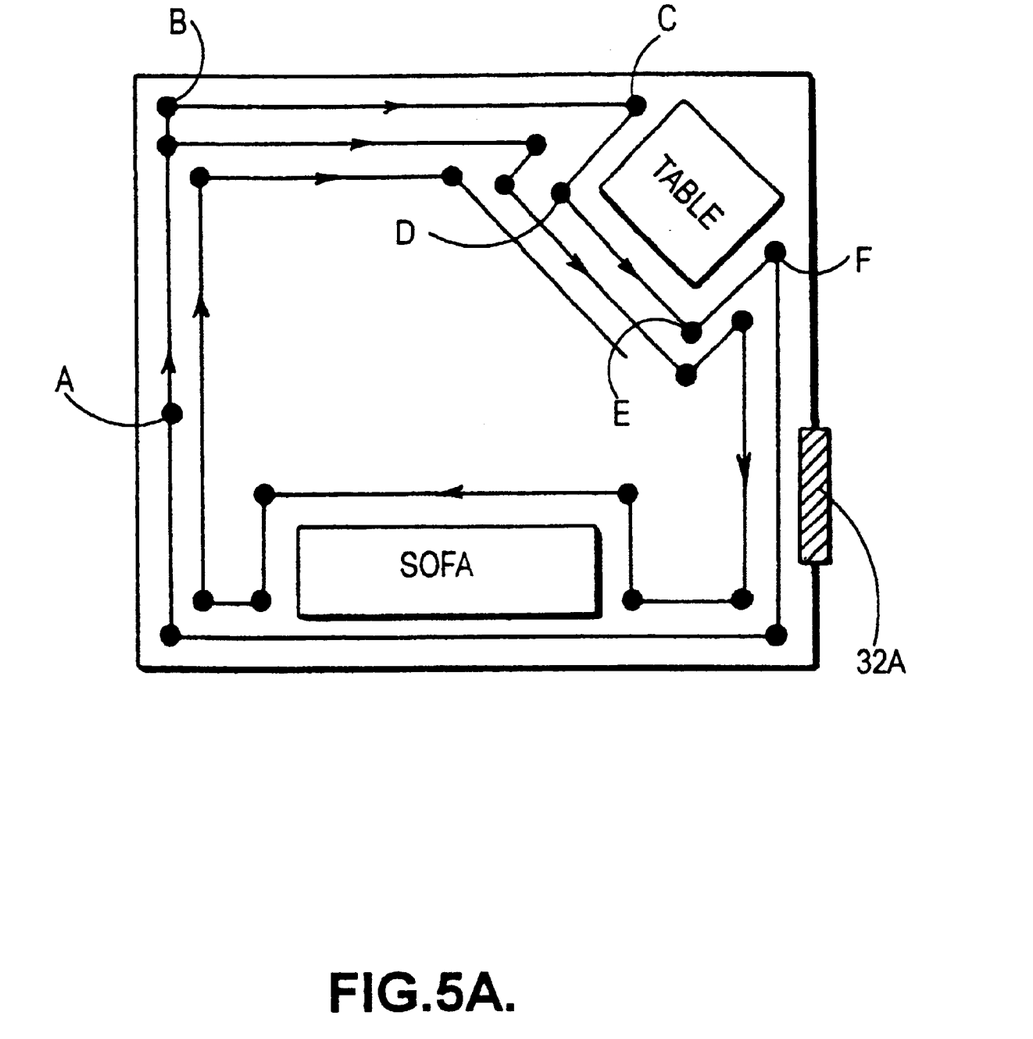
FIG. 5A is a schematic view illustrating one scenario of operating the robotic floor cleaning device.
Figure 5B:
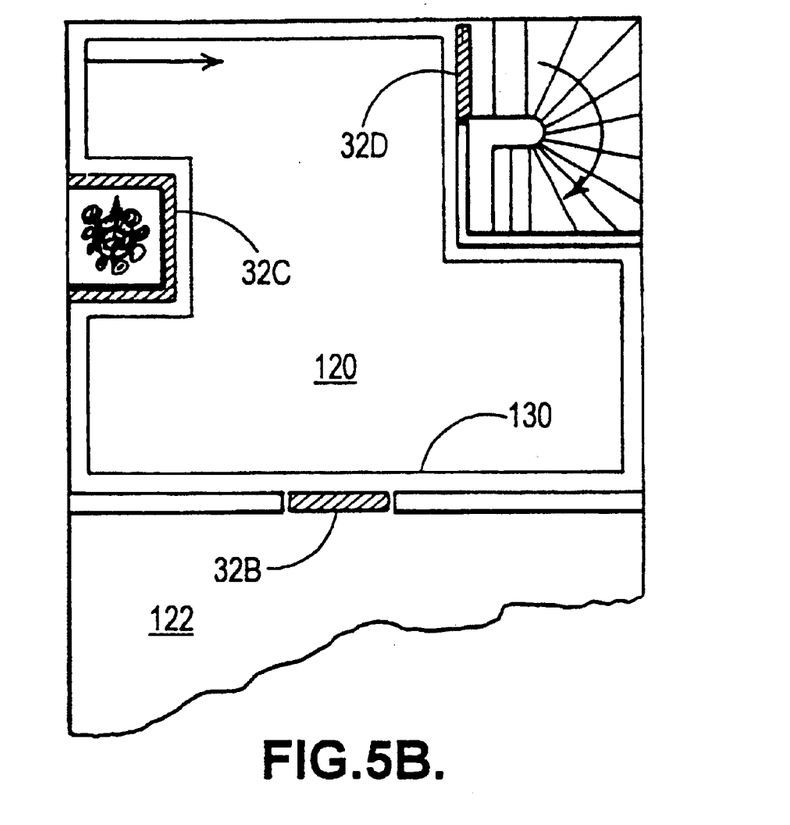
FIG. 5B is a schematic view illustrating another scenario of operating the robotic floor cleaning device.
Figure 5C:
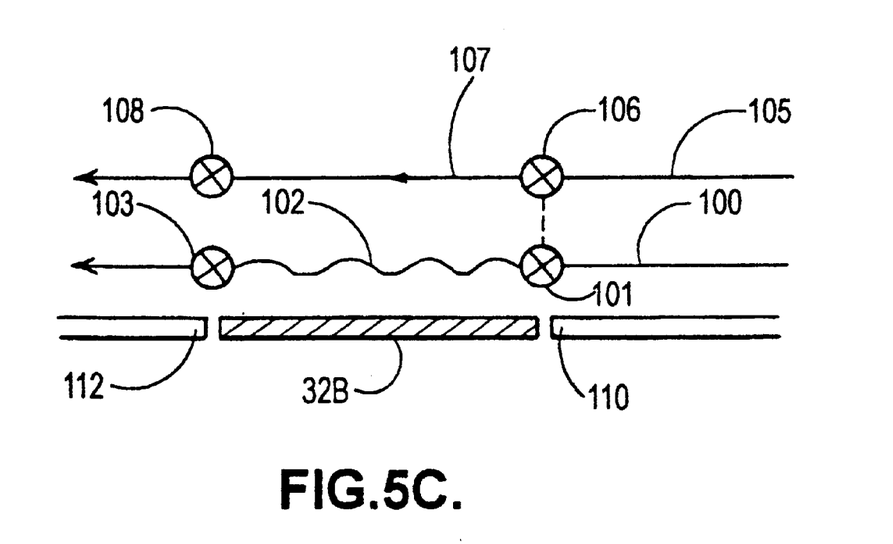
FIG. 5C is a more detailed view of the area in FIG. 5B where the threshold locator is positioned.

FIGS. 5A–5C illustrate the way in which the cleaner operates in a domestic environment. Starting with FIG. 5A, the cleaner is, typically, placed alongside a wall (position A) and energised to move forwardly along the edge of the room. The various sensors 27 to 31 detect any portable threshold locators 32A, obstacles in the room and other room features, such as corners of a room and fireplaces, and the processing circuitry 23 will navigate the robotic vacuum cleaner in order to avoid any such obstacles and to change direction when a feature of a room is reached. At each change of direction (positions B, C, D), the processing circuitry 23 stores information received from the light detector 17 and also from the four main ultrasonic receivers 29. These positions are known as "waypoints". It can also store information on the direction in which the cleaner turns at each change of direction. It will also constantly monitor the information received from the detector 17 and the four main receivers 29 and compare this with information previously stored. When the robotic vacuum cleaner reaches a position in which the information received from the light detector 17 and the four main receivers 29 is the same or substantially the same as information previously stored, the processing circuitry 23 determines that the robotic vacuum cleaner has completed a complete traverse around the room and is programmed to cause the robotic vacuum cleaner to step inwards. Preferably, the distance by which the cleaner steps inwardly, the step distance, is substantially one cleaner width. On subsequent circuits of the room the processing circuitry 23 stores sensor data at changes of direction. It associates this with previously stored information by attempting to match the new with the previous information. Two sets of data that are sufficiently similar to one another are deemed to be matched and are associated with one another in memory 97. Changes of direction on subsequent circuits can be identified by comparing the information received from the light detector 17 and the four main receivers 29 with previously stored information to allow the robotic vacuum cleaner to navigate itself around the room avoiding any obstacles in its path in a generally inwardly spiral manner. The sensor information from waypoints (B, C, D, E.) visited by the cleaner are stored in a waypoint database, stored in memory 97.

This operating method is more particularly described in our co-pending International Patent Application No. [our reference GBP0100]. However, other strategies can equally be used to navigate around the room.

If the robotic vacuum cleaner is initially placed in the middle of the room, it will find a wall or obstacle. If it finds a wall it will then follow the path described above. If it finds a feature (such as a central fireplace) or an obstacle in the centre of the room, it will complete a circuit around that feature or obstacle and then follow a generally outwardly spiral path.

FIG. 5B shows another scenario in which the cleaner is operated. A user has placed threshold locators 32B, 32C, 32D in the room 120 to mark the boundary of the area within which the cleaner is to be confined. Locator 32B lies across the threshold of an open doorway to prevent the cleaner from escaping into room 122. Locators 32C are placed around a plant which is a difficult object for the cleaner to properly detect, the locators 32C clearly marking a boundary for the cleaner. Locator 32D is placed along the threshold of a descending stairway. In use, the cleaner operates within the area defined by the walls of the room 120 and the threshold locators 32B, 32C, 32D. The outermost path of the cleaner in room 120 is shown by line 130. Preferably, threshold locator 32B, which marks the boundary between rooms 120 and 122, has a special identity which can be recognised by the cleaner. Where the threshold locator is a passive resonant circuit, the special identity can be a response at a resonant frequency which is different from the resonant frequency generated by the other threshold locators 32C, 32D. The cleaner can be programmed to operate so that it firstly regards the threshold marked by threshold locator 32B as a part of the boundary which should not be crossed. Once the cleaner has completely traversed the floor area in room 120, it can then cross the threshold marked by threshold locator 32B and move into room 122. The cleaner uses an appropriate method to establish when the room 120 has been completely traversed. One preferred method operates the cleaner to cover the floor area in a generally inwardly spiralling manner towards the centre of the room, the cleaner stepping inwardly after each circuit of the room and determining that it has completely traversed the room when it has reached the centre of the room. Upon determining that the room has been completely traversed, the cleaner navigates itself to the threshold locator that marks the threshold to entering the adjacent room 122. Threshold locator 32B carries some form of identification to allow a user to recognise this locator as one that should be used at the threshold between rooms, such as text marking.

Figure 6:
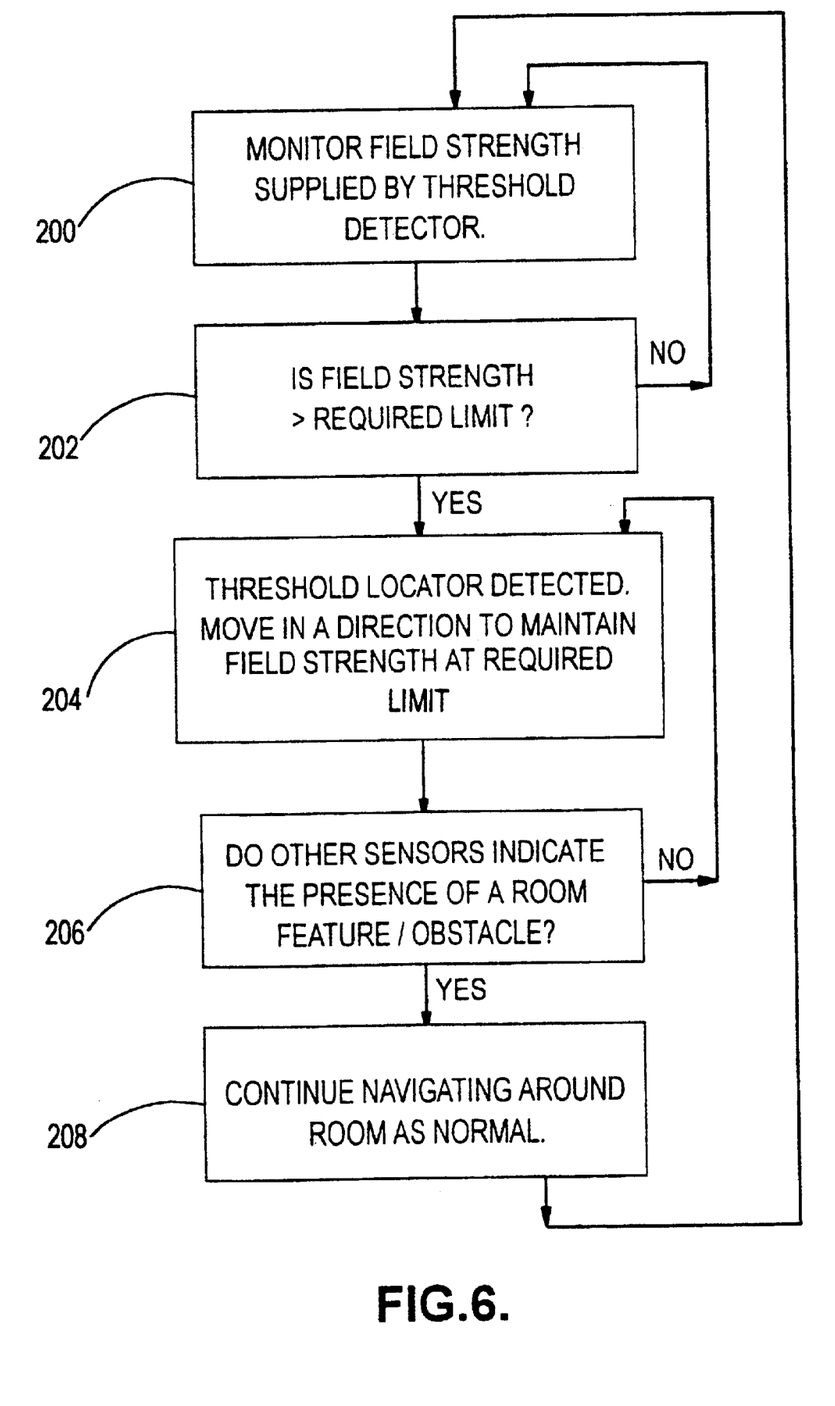
FIG. 6 is a flow diagram of a method performed by the autonomous vehicle to detect the presence of a threshold locator; and, FIG. 7 is a schematic diagram of the functional blocks of the robotic floor cleaning device which perform the method of FIG. 6.
Figure 7:
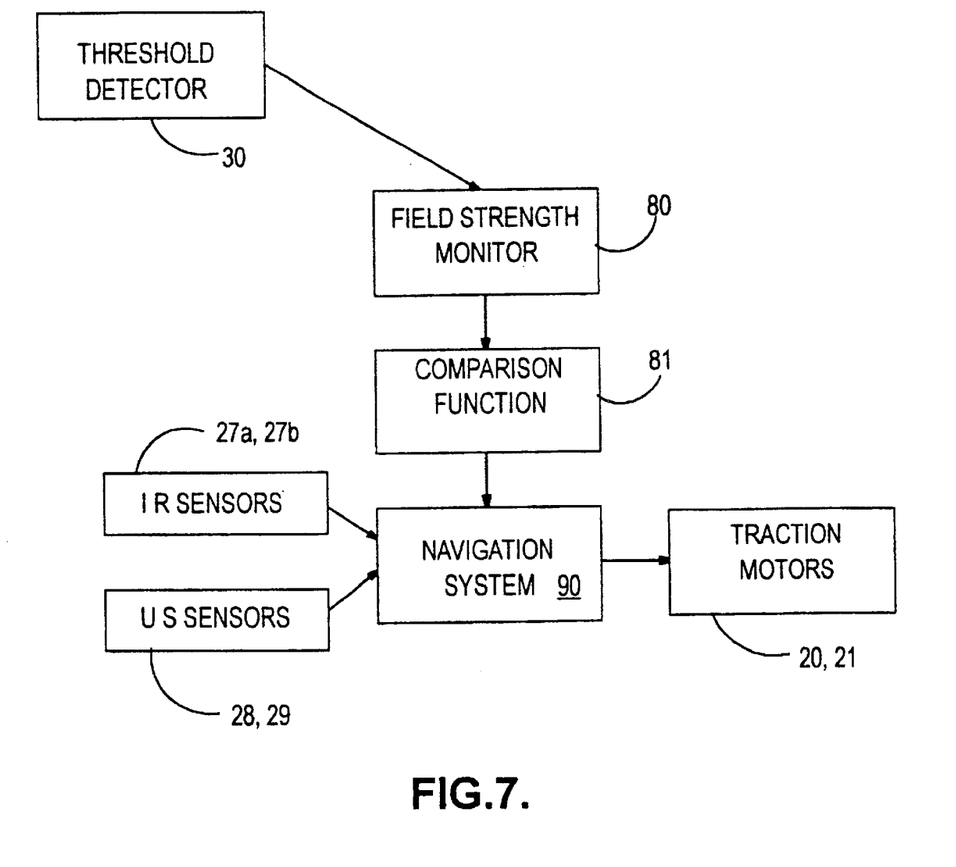

FIG. 6 shows a flow diagram of a preferred method performed by the cleaner to detect the presence of a threshold locator and FIG. 7 schematically shows the functional blocks of the cleaner which perform this method.

Threshold detector 30 provides an output which is representative of the field generated by the threshold locator. As described above, this field can generated by a passive resonant circuit at the locator 32 in response to an exciting signal generated by the cleaner. A field strength monitor function 80 receives the signal from the threshold detector hardware (typically a receive coil and an amplifier) and converts this into a value indicative of the received field strength. This can be achieved by using an analogue to digital converter. This activity is shown as step 200 in FIG. 6.

The field strength value is compared with a limit by a comparison function 81. When the field strength of the received signal exceeds the limit, then a threshold locator is deemed to be present close to the cleaner and a control signal is sent to the navigation system 90 (step 202).

The navigation system then navigates the cleaner along a path around the threshold locator. It achieves this by receiving the output of the field strength monitor 80 and steering the cleaner so as to maintain the received field strength at a predetermined limit (step 204).

The navigation system 90 sends control signals to traction motors 20, 21. In order to detect when the cleaner has passed the threshold, the navigation system continues to receive inputs from its other sensors., the infra-red 27a, 27b and ultrasonic sensors 28, 29, and determines when a room feature reappears that the cleaner can track. (Step 206). When a room feature is detected, the cleaner continues navigation around the room in a normal manner. (Step 208).

The path of the cleaner around the threshold locator 32B is shown in detail in FIG. 5C. As previously described, a preferred method of navigating the cleaner around a room is based on storing measurements from the on-board sensors whenever the cleaner reaches a room feature, known as "waypoints". As the cleaner travels around the perimeter of the room, it stores waypoints at room features where the cleaner is forced to change direction. The cleaner follows a path which is parallel and close to the wall 110 (path 100).

At position 101 the cleaner attempts to follow the wall as the cleaner considers the door frame to be a continuation of the wall. However, the threshold detector detects the presence of the threshold locator 32B and the navigation system stops its normal wall-tracking operation. Instead, the cleaner follows a path which is generally parallel path to the edge of the threshold locator 32B (102) until the cleaner reaches point 103 where the other sensors detect the presence of the door frame and wall (112). When the cleaner first detects the presence of a threshold locator (position 101) it takes a waypoint, i.e. it stores measurements from on-board sensors. On subsequent circuits of the room, when the cleaner is travelling around the room at a distance inwardly from the perimeter of the room (known as a scan distance), the cleaner may not be able to directly detect the presence of the threshold locator. Passive resonant circuits can only be detected when the exciting coil on the cleaner and the resonant coil on the threshold locator 32 are closely located to one another. On a subsequent circuit of the room (path 105, FIG. 5C) the cleaner detects the edge of wall 110. Two alternative ways of operating the cleaner on subsequent circuits will now be described.

In the first method, the cleaner takes a waypoint at point 106 upon detecting the edge of wall 110. By comparing the data at this new waypoint 106 with previously stored data, it finds that the new data matches the data for position 101. It knows, from the record in waypoint database, that point 101 represents the start of a part of the boundary of the room that is marked by threshold locator 32B. Therefore, the cleaner continues to move forward (direction 107) rather than attempting to follow the physical boundary of the room (wall 110). If necessary, the cleaner can detect the presence of wall 112 at position 108, take a waypoint, and by matching, can match this with the data taken at position 103 which the cleaner knows is the end of the boundary marked by the threshold locator 32B.

In an alternative method, upon detecting the edge of wall 110 at point 106, the cleaner tracks the wall 110 to arrive at point 101 where it detects threshold locator 32B. The cleaner then moves along the boundary defined by the threshold locator 32B in the same manner as previously described for the perimeter circuit until, at point 103 it detects the wall and moves inwardly to resume a circuit of the room at the same scan distance at which the cleaner was previously operating.

In the schematic diagram of FIG. 7, the field strength monitor 80, comparison function 81 and navigation system 90 can all be realised as software running on the processing circuitry 23 (FIG. 2).

What is claimed is:

1. An autonomous vehicular appliance, comprising at least two types of threshold locators having differing transmitting signals and being capable of defining at least part of a boundary of an area within which the autonomous vehicular appliance is to be confined at least temporarily, a navigation system for navigating the appliance around the area and a detection system to allow the appliance to detect the presence of the threshold locators, the detection system comprising means for receiving a signal from at least one each of the two types of threshold locators, and wherein the appliance is configured to use a received signal to detect parts of the boundary defined by the threshold locators, and upon detecting a first type of threshold locator, to prevent itself from crossing the part of the boundary marked by the first type of threshold locator and, upon detecting a second type of threshold locator, to prevent itself from crossing the part of the boundary marked by the second type of threshold locator until a certain condition has been met.

2. The appliance according to claim 1, wherein the appliance is configured, upon detecting the second type of threshold locator, to prevent itself from crossing the part of the boundary marked by the threshold locator until the area has been completely traversed by the appliance.

3. The appliance according to claim 2, wherein the second type of threshold locator transmits a signal which is indicative of marking a threshold to another area.

4. The appliance according to claim 1, wherein the autonomous vehicular appliance includes a signal transmitter and a signal receiver and the threshold locator includes means for modifying a signal received from the signal transmitter and for transmitting the modified signal to the signal receiver.

5. The appliance according to claim 4, wherein the modifying means includes a passive circuit.

6. The appliance according to claim 5, wherein the passive circuit is a loop resonator circuit and the signal transmitter is arranged to transmit a signal at or close to the resonant frequency of the loop resonator circuit.

7. The appliance according to claim 6, wherein the threshold locator is elongate and the resonant circuit is distributed along the length of the locator.

8. The appliance according to claim 4, wherein the transmitter generates a magnetic signal and the modifying means includes a metal alloy.

9. The appliance according to claim 1, wherein the threshold detector includes a signal transmitter and the autonomous vehicular appliance includes a signal receiver.

10. The appliance according to claim 1 wherein the navigation system includes a light detector for detecting the level of ambient light, memory means for storing information representative of the level of ambient light when the autonomous vehicular appliance changes direction and means for comparing the level of ambient light with previously stored information so that the autonomous vehicular appliance can identify when the level of ambient light is the same or substantially the same as a level previously stored.

11. The appliance according to claim 1, wherein the navigation system also comprises a plurality of sensors for detecting obstacles and features of the room.

12. The appliance according to claim 1, wherein the detection system comprises means for detecting when a parameter of the received signal meets a required condition.

13. The appliance according to claim 1, wherein detection system comprises means for detecting when the field strength of the received signals exceeds a predetermined limit.

14. The appliance according to claim 13, wherein, upon detecting that the field strength of the received signals exceeds a predetermined limit, the navigation system is configured to navigate the appliance in a direction to follow a path of substantially equal field strength.

15. An autonomous vehicular appliance, comprising a navigation system for navigating the appliance around an area and a detection system to allow the appliance to detect the presence of at least two types of portable threshold locators having different transmitting signals and capable of defining at least part of a boundary of an area within which the autonomous vehicular appliance is to be confined at least temporarily, the detection system comprising means for receiving signals from at least two types of threshold locator and wherein the appliance is configured to use the received signals to detect the parts of the boundary defined by the threshold locators, and upon detecting a first type of threshold locator, to prevent itself from crossing the part of the boundary marked by the first type of threshold locator and, upon detecting a second type of threshold locator, to prevent itself from crossing the part of the boundary marked by the second type of threshold locator until a certain condition has been met.

16. An autonomous vehicular appliance according to claim 15, which is configured to prevent itself from crossing the part of the boundary marked by the second type of threshold locator until the area has been completely traversed by the appliance.

17. An autonomous vehicular appliance according to claim 15, further comprising a signal transmitter for transmitting signals to the threshold locators and a signal receiver for receiving signals from the threshold locators.

18. An autonomous vehicular appliance according to claim 17 wherein, upon detecting that the received signal exceeds a predetermined limit, the navigation system is arranged to navigate the appliance in a direction to follow a path of substantially equal field strength.

19. An autonomous vehicular appliance according to claim 15, wherein the navigation system includes a light detector for detecting the level of ambient light, memory means for storing information representative of the level of ambient light when the autonomous vehicular appliance changes direction and means for comparing the level of ambient light with previously stored information so that the autonomous vehicular appliance can identify when the level of ambient light is the same or substantially the same as level previously stored.

20. An autonomous vehicular appliance according to claim 15, wherein the navigation system also comprises a plurality of sensors for detecting obstacles and features of the room.

21. An autonomous vehicular appliance according to claim 15, wherein the detection system comprises means for detecting when a parameter of the received signals meets a required condition.

22. A method according to claim 21 wherein the appliance is arranged, upon detecting the second type of threshold locator, to prevent itself from crossing the part of the boundary marked by the threshold locator until the area has been completely traversed by the appliance.

23. The appliance of claim 1 or 15, wherein the autonomous vehicular appliance is a robotic floor cleaning device.

24. The appliance according to claim 23, wherein the robotic floor cleaning device is a robotic vacuum cleaner.

25. A method of cleaning an area using an autonomous vehicular appliance, the method comprising placing at least one each of at least two types of portable threshold locator at locations to define at least part of a boundary of an area within which the autonomous vehicular appliance is to be confined at least temporarily and operating the appliance to clean the area, wherein the appliance in operation uses a navigation system to navigate around the area and a detection system to allow the appliance to detect the presence of the portable threshold locators, the detection system receiving signals from the threshold locators and the appliance using the received locators to detect the parts of the boundary defined by the threshold locators, and upon detecting a first type of threshold locator, prevents itself from crossing the part of the boundary worked by the first type of threshold locator and, upon detecting a second type of threshold locator, prevents itself from crossing the part of the boundary marked by the second type of threshold location until a certain condition has been met.

26. A method according to claim 25, wherein the appliance is configured to prevent itself from crossing the part of the boundary marked by the second type of threshold locator until the area has been completely traversed by the appliance.

* * * * *